(12) United States Patent
Xu

(10) Patent No.: US 12,535,674 B2
(45) Date of Patent: Jan. 27, 2026

(54) MICRO-ELECTRO-MECHANICAL SCANNING MIRROR CONTROL METHOD, CONTROL APPARATUS, AND SYSTEM

(71) Applicant: SHENZHEN YINWANG INTELLIGENT TECHNOLOGIES CO., LTD., Shenzhen (CN)

(72) Inventor: Yu Xu, Taipei (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 957 days.

(21) Appl. No.: 17/717,383

(22) Filed: Apr. 11, 2022

(65) Prior Publication Data

US 2022/0244527 A1 Aug. 4, 2022

Related U.S. Application Data

(63) Continuation of application No. PCT/CN2020/098912, filed on Jun. 29, 2020.

(51) Int. Cl.
*G02B 26/08* (2006.01)
*G02B 26/10* (2006.01)
*H04N 9/31* (2006.01)

(52) U.S. Cl.
CPC ....... *G02B 26/0833* (2013.01); *G02B 26/101* (2013.01); *H04N 9/3135* (2013.01)

(58) Field of Classification Search
CPC .............. G02B 26/0833; G02B 26/101; H04N 9/3135; H04N 9/3129
See application file for complete search history.

(56) References Cited

U.S. PATENT DOCUMENTS

| | | | |
|---|---|---|---|
| 2009/0161191 A1 | 6/2009 | Powell | |
| 2018/0047166 A1* | 2/2018 | Viswanathan | ....... H04N 9/3185 |
| 2020/0174356 A1 | 6/2020 | Roberts et al. | |

FOREIGN PATENT DOCUMENTS

| | | |
|---|---|---|
| CN | 1896792 A | 1/2007 |
| CN | 103098116 A | 5/2013 |
| | (Continued) | |

OTHER PUBLICATIONS

International Search Report and Written Opinion in International Appln. No. PCT/CN2020/098912, mailed on Mar. 25, 2021, 13 pages (with partial English translation).

(Continued)

*Primary Examiner* — Euncha P Cherry
(74) *Attorney, Agent, or Firm* — Fish & Richardson P.C.

(57) ABSTRACT

This disclosure provides micro-electro-mechanical scanning mirror control methods, control apparatuses, and systems. One example control method includes generating a control signal, where the control signal is used to control a micro-electro-mechanical scanning mirror to project, in a target scanning manner, lasers corresponding to pixels in a to-be-scanned image, to output a projected image of the to-be-scanned image. The target scanning manner includes a first scanning manner and a second scanning manner, and the first scanning manner and the second scanning manner have different initial locations in the to-be-scanned image. The control signal is sent to the micro-electro-mechanical scanning mirror. The to-be-scanned image is scanned in the first scanning manner and the second scanning manner, that is, from at least two different directions.

15 Claims, 5 Drawing Sheets

200

Generate a control signal, where the control signal is used to control a micro-electro-mechanical scanning mirror to project, in a target scanning manner, lasers corresponding to pixels in a to-be-scanned image, to output a projected image of the to-be-scanned image, the target scanning manner includes a first scanning manner and a second scanning manner, and the first scanning manner and the second scanning manner have different initial locations in the to-be-scanned image ⸺ S210

Send the control signal to the micro-electro-mechanical scanning mirror ⸺ S220

(56) References Cited

FOREIGN PATENT DOCUMENTS

| | | |
|---|---|---|
| CN | 103246140 A | 8/2013 |
| CN | 103765877 A | 4/2014 |
| CN | 103984197 A | 8/2014 |
| CN | 104603672 A | 5/2015 |
| CN | 107637071 A | 1/2018 |
| CN | 107924657 A | 4/2018 |
| JP | 2007093644 A | 4/2007 |
| JP | 2012037616 A | 2/2012 |

OTHER PUBLICATIONS

Office Action in Chinese Appln. No. 202080004880.3, dated Sep. 14, 2021, 8 pages.
Office Action in Chinese Appln. No. 202080004880.3, dated Dec. 13, 2021, 7 pages.

* cited by examiner

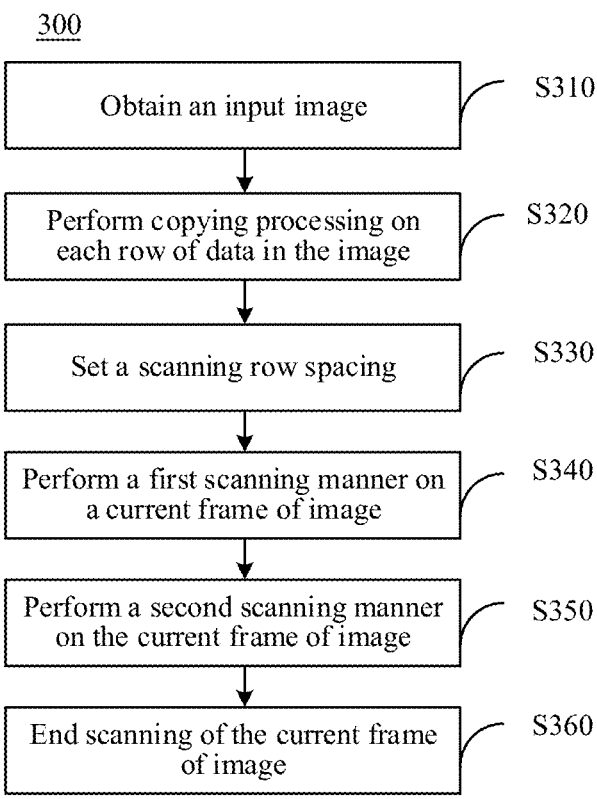

Original image → Image obtained after copying processing

MICRO-ELECTRO-MECHANICAL SCANNING MIRROR CONTROL METHOD, CONTROL APPARATUS, AND SYSTEM

CROSS-REFERENCE TO RELATED APPLICATIONS

This application is a continuation of International Application No. PCT/CN2020/098912, filed on Jun. 29, 2020. The disclosure of which is hereby incorporated by reference in its entirety.

TECHNICAL FIELD

This application relates to the field of micro projection technologies, and in particular, to a micro-electro-mechanical scanning mirror control method, a micro-electro-mechanical scanning mirror control apparatus, and a micro-electro-mechanical scanning mirror imaging system.

BACKGROUND

A laser beam scanning (LBS) technology is widely used and developed due to advantages such as a simple structure, a small volume, low power consumption, and no focusing requirement. LBS is mainly implemented by using a laser control system, a three-color laser diode, micro-electro-mechanical systems (MEMS), a scanning mirror control system, and the like. Projection principles of the LBS are that the laser control system controls, based on an obtained image, the three-color laser diode to emit lasers to a reflector of the MEMS. Under control of a drive signal generated by the scanning mirror control system, the reflector swings around two axes in a horizontal direction and a vertical direction, to reflect the three-color lasers onto a screen to composite pixels, to implement image display.

Currently, in a micro-electro-mechanical scanning mirror control method, a raster scanning manner is usually used, that is, a reflector of MEMS is enabled to perform scanning on a display screen from top to bottom in a same-direction scanning manner. However, periodic moire that is bright and gradually dim in light brightness is generated in a projected image obtained in the raster scanning manner, greatly affecting visual experience.

Therefore, how to improve quality of scanning imaging to improve visual experience of a user becomes a problem that urgently needs to be resolved.

SUMMARY

This application provides a micro-electro-mechanical scanning mirror control method, control apparatus, and system. In a target scanning manner used in embodiments of this application, that is, a to-be-scanned image is scanned in at least two different directions, so that imaging quality of a projected image of the to-be-scanned image can be improved.

According to a first aspect, a micro-electro-mechanical scanning mirror control method is provided, including: generating a control signal, where the control signal is used to control a micro-electro-mechanical scanning mirror to project, in a target scanning manner, lasers corresponding to pixels in a to-be-scanned image, to output a projected image of the to-be-scanned image, the target scanning manner includes a first scanning manner and a second scanning manner, and the first scanning manner and the second scanning manner have different initial locations in the to-be-scanned image; and sending the control signal to the micro-electro-mechanical scanning mirror.

It should be understood that the target scanning manner may be a scanning manner in which the to-be-scanned image is scanned in at least two different directions. An initial location of the first scanning manner and an initial location of the second scanning manner may be start locations at which the to-be-scanned image is scanned, namely, scanning start locations.

In a possible implementation, the target scanning manner may be a scanning manner in which some or all pixels in a same row of pixels in the to-be-scanned image are scanned in at least two different directions. If scanning is performed in one direction, some areas cannot be scanned, and consequently a dark pattern appears in corresponding areas in the projected image of the to-be-scanned image. If scanning is performed in at least two different directions, an area that cannot be scanned in one direction may be compensated to a specific degree.

In this embodiment of this application, the pixels in the to-be-scanned image are scanned in the target scanning manner, that is, the to-be-scanned image is scanned in at least two different directions, so that an area that cannot be scanned in one scanning direction can be compensated to a specific degree. Therefore, scanning the to-be-scanned image in the target scanning manner in this embodiment of this application can effectively alleviate moire appearing in the projected image of the to-be-scanned image. This improves imaging quality of the projected image of the to-be-scanned image.

In a possible implementation, the lasers corresponding to the pixels in the scanned image may be lasers emitted by a laser diode to the micro-electro-mechanical scanning mirror based on the pixels in the to-be-scanned image. For example, a three-color laser may be emitted based on each pixel in the to-be-scanned image, where the three-color laser includes a red laser, a green laser, or a blue laser.

With reference to the first aspect, in some implementations of the first aspect, the initial location of the first scanning manner and the initial location of the second scanning manner are located in a same row of pixels in the to-be-scanned image.

In a possible implementation, the initial location of the first scanning manner and the initial location of the second scanning manner may be respectively located in opposite locations in a same row of pixels in the to-be-scanned image. For example, one row of pixels includes N columns, the initial location of the first scanning manner may be located in the first column in a same row of pixels, and the initial location of the second scanning manner may be located in an $N^{th}$ column in the same row of pixels.

In this embodiment of this application, the first scanning manner and the second scanning manner with different initial locations are used, so that an area that cannot be scanned in one scanning direction can be compensated to a specific degree. Therefore, the target scanning manner in this embodiment of this application can effectively alleviate moire appearing in the projected image of the to-be-scanned image. This improves imaging quality of the projected image of the to-be-scanned image.

With reference to the first aspect, in some implementations of the first aspect, the to-be-scanned image includes N columns of pixels, the initial location of the first scanning manner and the initial location of the second scanning manner are respectively located in an $i^{th}$ column of pixels and a $j^{th}$ column of pixels in the to-be-scanned image, both i and j are positive integers less than or equal to N, and i is different from j.

In a possible implementation, the initial location of the first scanning manner may be located in the first column of pixels in the to-be-scanned image, and the initial location of the second scanning manner may be located in the last column of pixels in the to-be-scanned image, that is, an Nth column of pixels in the to-be-scanned image.

With reference to the first aspect, in some implementations of the first aspect, the control signal is used to control, by using a phase shift method, the micro-electro-mechanical scanning mirror to implement the target scanning manner.

With reference to the first aspect, in some implementations of the first aspect, a phase difference between a control signal used to control the micro-electro-mechanical scanning mirror to perform scanning in the first scanning manner and a control signal used to control the micro-electro-mechanical scanning mirror to perform scanning in the second scanning manner in the control signal is half a period.

In a possible implementation, a fast-axis vibration frequency of the micro-electro-mechanical scanning mirror may be dynamically controlled to implement phase shift.

For example, half a phase may be controlled to be added for the first scanning manner through frequency adjustment, and half a phase may be controlled to be reduced for the second scanning manner through frequency adjustment, so that the initial location of the first scanning manner is different from the initial location of the second scanning manner.

With reference to the first aspect, in some implementations of the first aspect, the control signal is further used to control a scanning row spacing of the micro-electro-mechanical scanning mirror, so that the micro-electro-mechanical scanning mirror projects, in the target scanning manner based on the scanning row spacing, the lasers corresponding to the pixels in the to-be-scanned image.

In this embodiment of this application, the scanning row spacing and a scanning manner of the micro-electro-mechanical scanning mirror may be adjusted, so that without a need to multiply resolution of the micro-electro-mechanical scanning mirror, scanning a same row of pixels in the to-be-scanned image in at least two different directions can effectively alleviate moire appearing in the projected image of the to-be-scanned image, and improve imaging quality of the projected image of the to-be-scanned image.

It should be understood that, in this embodiment of this application, a control signal used to control the micro-electro-mechanical scanning mirror to perform scanning in the target scanning manner and a control signal used to control the scanning row spacing of the micro-electro-mechanical scanning mirror may be sent to the micro-electro-mechanical scanning mirror together, or may be divided into a plurality of control signals and the plurality of control signals may be sent to the micro-electro-mechanical scanning mirror.

According to a second aspect, a micro-electro-mechanical scanning mirror control apparatus is provided, including: a processing unit, configured to generate a control signal, where the control signal is used to control a micro-electro-mechanical scanning mirror to project, in a target scanning manner, lasers corresponding to pixels in a to-be-scanned image, to output a projected image of the to-be-scanned image, the target scanning manner includes a first scanning manner and a second scanning manner, and the first scanning manner and the second scanning manner have different initial locations in the to-be-scanned image; and a sending unit, configured to send the control signal to the micro-electro-mechanical scanning mirror.

It should be understood that the target scanning manner may be a scanning manner in which the to-be-scanned image is scanned in at least two different directions.

In a possible implementation, the target scanning manner may be a scanning manner in which some or all pixels in a same row of pixels in the to-be-scanned image are scanned in at least two different directions. If scanning is performed in one direction, some areas cannot be scanned, and consequently a dark pattern appears in corresponding areas in the projected image of the to-be-scanned image. If scanning is performed in at least two different directions, an area that cannot be scanned in one direction may be compensated to a specific degree.

In this embodiment of this application, the pixels in the to-be-scanned image are scanned in the target scanning manner, that is, the to-be-scanned image is scanned in at least two different directions, so that an area that cannot be scanned in one scanning direction can be compensated to a specific degree. Therefore, scanning the to-be-scanned image in the target scanning manner in this embodiment of this application can effectively alleviate moire appearing in the projected image of the to-be-scanned image. This improves imaging quality of the projected image of the to-be-scanned image.

In a possible implementation, the lasers corresponding to the pixels in the scanned image may be lasers emitted by a laser diode to the micro-electro-mechanical scanning mirror based on the pixels in the to-be-scanned image. For example, a three-color laser may be emitted based on each pixel in the to-be-scanned image, where the three-color laser includes a red laser, a green laser, or a blue laser.

With reference to the second aspect, in some implementations of the second aspect, an initial location of the first scanning manner and an initial location of the second scanning manner are located in a same row of pixels in the to-be-scanned image.

In a possible implementation, the initial location of the first scanning manner and the initial location of the second scanning manner may be respectively located in opposite locations in a same row of pixels in the to-be-scanned image. For example, one row of pixels includes N columns, the initial location of the first scanning manner may be located in the first column in a same row of pixels, and the initial location of the second scanning manner may be located in an $N^{th}$ column in the same row of pixels.

In this embodiment of this application, the first scanning manner and the second scanning manner with different initial locations are used, so that an area that cannot be scanned in one scanning direction can be compensated to a specific degree. Therefore, the target scanning manner in this embodiment of this application can effectively alleviate moire appearing in the projected image of the to-be-scanned image. This improves imaging quality of the projected image of the to-be-scanned image.

With reference to the second aspect, in some implementations of the second aspect, the to-be-scanned image includes N columns of pixels, the initial location of the first scanning manner and the initial location of the second scanning manner are respectively located in an $i^{th}$ column of pixels and a $j^{th}$ column of pixels in the to-be-scanned image, both i and j are positive integers less than or equal to N, and i is different from j.

In a possible implementation, the initial location of the first scanning manner may be located in the first column of pixels in the to-be-scanned image, and the initial location of the second scanning manner may be located in the last column of pixels in the to-be-scanned image, that is, an $N^{th}$ column of pixels in the to-be-scanned image.

With reference to the second aspect, in some implementations of the second aspect, the control signal is used to control, by using a phase shift method, the micro-electro-mechanical scanning mirror to implement the target scanning manner.

With reference to the second aspect, in some implementations of the second aspect, a phase difference between a control signal used to control the micro-electro-mechanical scanning mirror to perform scanning in the first scanning manner and a control signal used to control the micro-electro-mechanical scanning mirror to perform scanning in the second scanning manner in the control signal is half a period.

In a possible implementation, a fast-axis vibration frequency of the micro-electro-mechanical scanning mirror may be dynamically controlled to implement phase shift.

For example, half a phase may be controlled to be added for the first scanning manner through frequency adjustment, and half a phase may be controlled to be reduced for the second scanning manner through frequency adjustment, so that the initial location of the first scanning manner is different from the initial location of the second scanning manner.

With reference to the second aspect, in some implementations of the second aspect, the control signal is further used to control a scanning row spacing of the micro-electro-mechanical scanning mirror, so that the micro-electro-mechanical scanning mirror projects, in the target scanning manner based on the scanning row spacing, the lasers corresponding to the pixels in the to-be-scanned image.

In this embodiment of this application, the scanning row spacing and a scanning manner of the micro-electro-mechanical scanning mirror may be adjusted, so that without a need to multiply resolution of the micro-electro-mechanical scanning mirror, scanning a same row of pixels in the to-be-scanned image in at least two different directions can effectively alleviate moire appearing in the projected image of the to-be-scanned image, and improve imaging quality of the projected image of the to-be-scanned image.

It should be understood that, in this embodiment of this application, a control signal used to control the micro-electro-mechanical scanning mirror to perform scanning in the target scanning manner and a control signal used to control the scanning row spacing of the micro-electro-mechanical scanning mirror may be sent to the micro-electro-mechanical scanning mirror together, or may be divided into a plurality of control signals and the plurality of control signals may be sent to the micro-electro-mechanical scanning mirror.

According to a third aspect, a micro-electro-mechanical scanning mirror control apparatus is provided, including: a memory, configured to store a program; and a processor, configured to execute the program stored in the memory. When the program stored in the memory is executed, the processor is configured to: generate a control signal, where the control signal is used to control a micro-electro-mechanical scanning mirror to project, in a target scanning manner, lasers corresponding to pixels in a to-be-scanned image, to output a projected image of the to-be-scanned image, the target scanning manner includes a first scanning manner and a second scanning manner, and the first scanning manner and the second scanning manner have different initial locations in the to-be-scanned image; and send the control signal to the micro-electro-mechanical scanning mirror.

In a possible implementation, the processor included in the control apparatus is further configured to execute the control method according to any one of the first aspect and the implementations of the first aspect.

It should be understood that an extension, a limitation, an explanation, and a description of related content in the first aspect are also applicable to the same content in the third aspect.

According to a fourth aspect, a micro-electro-mechanical scanning mirror imaging system is provided, including a micro-electro-mechanical scanning mirror; and the control apparatus according to any one of the second aspect and the implementations of the second aspect.

According to a fifth aspect, a computer-readable medium is provided. The computer-readable medium stores program code to be executed by a device, and the program code includes instructions used to execute the control method according to any one of the first aspect and the implementations of the first aspect.

According to a sixth aspect, a computer program product including an instruction is provided. When the computer program product runs on a computer, the computer is enabled to execute the control method according to any one of the first aspect and the implementations of the first aspect.

According to a seventh aspect, a chip is provided. The chip includes a processor and a data interface, and the processor reads, by using the data interface, instructions stored in a memory, to execute the control method according to any one of the first aspect and the implementations of the first aspect.

Optionally, in an implementation, the chip may further include a memory, the memory stores instructions, the processor is configured to execute the instructions stored in the memory, and when the instructions are executed, the processor is configured to execute the control method according to any one of the first aspect and the implementations of the first aspect.

BRIEF DESCRIPTION OF DRAWINGS

FIG. 3 is a schematic flowchart of a micro-electro-mechanical scanning mirror control method according to this application;

FIG. 4 is a schematic flowchart of a micro-electro-mechanical scanning mirror control method according to this application;

DESCRIPTION OF EMBODIMENTS

Figure 1:
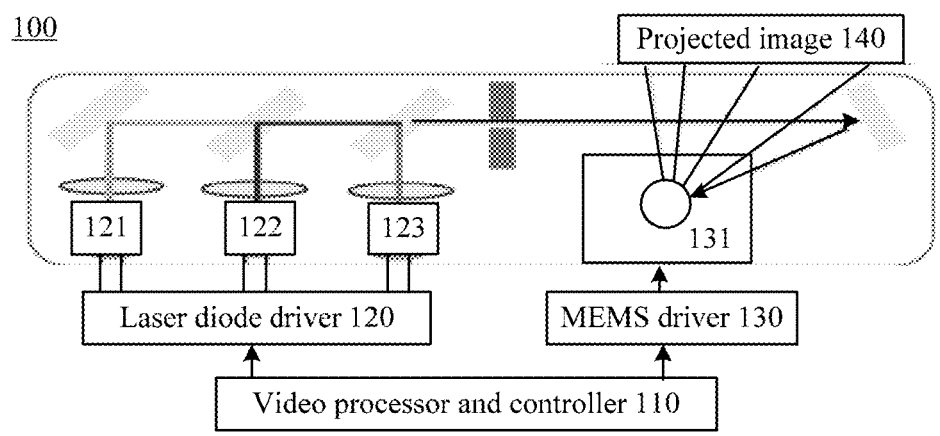
FIG. 1 is a schematic diagram of a system architecture according to an embodiment of this application.

The following describes the technical solutions in the embodiments of this application with reference to the accompanying drawings in the embodiments of this application. Clearly, the described embodiments are merely some rather than all of the embodiments of this application. All other embodiments obtained by a person of ordinary skill in the art based on the embodiments of this application without creative efforts shall fall within the protection scope of this application.

For ease of understanding, the following first describes related terms and concepts that may be used in the embodiments of this application.

1. Laser Beam Scanning (LBS) Imaging Technology

LBS mainly includes a laser control system, a three-color laser diode (a red, green, and blue laser diode, namely, an RGB laser diode), micro-electro-mechanical systems (MEMS), a scanning mirror control system, and the like. A projection principle of the LBS is that the laser control system controls, based on an obtained image, the RGB three-color laser diode to emit lasers to a reflector of the MEMS; and under control of a drive signal generated by the scanning mirror control system, the reflector swings around two axes in a horizontal direction and a vertical direction, to reflect the RGB three-color lasers onto a screen to composite pixels, to implement image display.

2. Micro-Electro-Mechanical Systems

In a micro-electro-mechanical systems technology, a complete micro display has been manufactured in a silicon substrate, and no additional upper-layer structure needs to be manufactured. An MEMS mirror assembly includes a reflector suspended in a gimbal frame, and the gimbal frame has a micro-machined energized coil. A braking element is mounted around an MEMS bare die, and is configured to provide a vibration drive force of a reflector surface. When the MEMS mirror assembly works, provided that a current is applied to the MEMS braking element, a torque can be generated on the gimbal frame, and components can be generated in two directions of rotating axes. The two components of the torque enable the gimbal frame to rotate around a flexural suspension and vibrate in a scanning mirror resonance mode, and the MEMS mirror surface is biaxially rotated through simple addition of horizontal and vertical waves.

3. Pixel

Pixels include small squares of an image. These small squares each have a clear location and an assigned color value, and colors and locations of the small squares determine an appearance of the image. The pixel may be considered as an indivisible unit or element in the entire image. That is, the pixel may be a unit or an element that cannot be further divided into smaller units or elements in the image, and the pixel exists in a form of a small square with a single color. Each dot matrix image includes a specific quantity of pixels, and these pixels determine a size of the image presented on a screen.

4. Moire

The moire is a high-frequency interference pattern that occurs on a photosensitive component in a device such as a digital camera or a scanner, and makes a colorful high-frequency irregular pattern appear in a picture.

The following describes technical solutions of this application in detail with reference to accompanying drawings.

FIG. 1 is a schematic diagram of a system architecture according to an embodiment of this application. A system architecture 100 may include a video processor and controller 110, a laser diode driver 120, an MEMS driver 130, and a projected image 140.

The video processor and controller 110 is configured to obtain a to-be-processed video or image. The to-be-processed video or image may be an image whose projected image 140 needs to be displayed through LBS.

In an example, the to-be-processed video or image may be a video photographed by an electronic device by using a camera, or the to-be-processed video or image may be a video obtained from an electronic device (for example, a video stored in an album of the electronic device, or a video obtained by the electronic device from the cloud).

For example, the laser diode driver 120 is configured to control running of a three-color laser diode. The three-color laser diode may include a blue laser diode 121, a red laser diode 122, and a green laser diode 123. For example, the laser diode driver 120 may control, based on the to-be-processed video or image obtained by the video processor and controller 110, the three-color laser diode to emit different lasers to a reflector of MEMS for the to-be-processed video or different pixels in the to-be-processed video.

For example, the MEMS driver 130 is configured to control running of a micro-electro-mechanical scanning mirror 131. For example, the MEMS driver may control a drive signal generated by the MEMS, to enable the reflector of the MEMS to swing around two axes in a horizontal direction and a vertical direction, to reflect a three-color laser onto a display screen to composite pixels, to display the to-be-processed image, that is, display the projected image 140.

Figure 2:
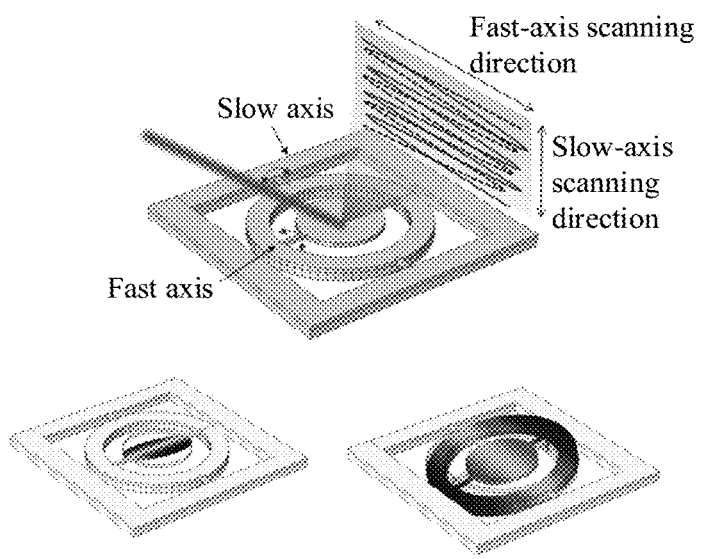
FIG. 2 is a schematic diagram of a working principle of a micro-electro-mechanical scanning mirror according to an embodiment of this application.

FIG. 2 is a schematic diagram of a working principle of a micro-electro-mechanical scanning mirror according to an embodiment of this application.

When a micro-electro-mechanical scanning mirror (which may also be referred to as a reflector) of MEMS works, a current may be applied to enable the reflector suspended in a gimbal frame to generate a torque. Components in two directions may be generated along rotating axes (for example, a fast axis and a slow axis) based on the torque. As shown in FIG. 2, the reflector may be biaxially rotated and vibrated by using the components in the two directions, so that a laser emitted by a laser diode to the reflector implements spatial horizontal and vertical scanning on the display screen.

Currently, in a micro-electro-mechanical scanning mirror control method, a raster scanning manner is usually used, that is, a reflector of MEMS is enabled to perform scanning on a display screen from left to right and from top to bottom. However, because light emitted by a laser diode to the reflector is Gaussian beams, and there is a spacing between the Gaussian beams, periodic moire that is bright and gradually dim in light brightness may be generated when the reflector performs imaging on the display screen, greatly affecting visual experience.

In view of this, this application provides a micro-electro-mechanical scanning mirror control method. A to-be-scanned image is scanned in at least two different directions, that is, the to-be-scanned image is scanned by using a target scanning manner, where the target scanning manner includes a first scanning manner and a second scanning manner, and the first scanning manner and the second scanning manner have different initial locations in the to-be-scanned image, so that an area that cannot be scanned in one scanning direction can be compensated to a specific degree. Therefore, in the embodiments of this application, scanning the to-be-scanned image in two different directions can effectively alleviate moire appearing in a projected image of the to-be-scanned image. This improves imaging quality of the projected image of the to-be-scanned image.

A scanning imaging method provided in this application may be applied to a micro projector, or may be applied to a head-up display (HUD) system in a vehicle.

The following describes, in detail with reference to FIG. 3, the micro-electro-mechanical scanning mirror control method provided in this application.

It should be understood that a micro-electro-mechanical scanning mirror control method shown in FIG. 3 may be executed by using the MEMS driver in the system architecture shown in FIG. 1.

A control method 200 shown in FIG. 3 includes step S210 and step S220. The following separately describes step S210 and step S220 in detail.

S210. Generate a control signal.

The control signal may be used to control a micro-electro-mechanical scanning mirror to project, in a target scanning manner, lasers corresponding to pixels in a to-be-scanned image, to output a projected image of the to-be-scanned image, the target scanning manner includes a first scanning manner and a second scanning manner, and the first scanning manner and the second scanning manner have different initial locations in the to-be-scanned image.

It should be understood that the target scanning manner may be a scanning manner in which the to-be-scanned image is scanned in at least two different directions.

In this embodiment of this application, in the target scanning manner, some or all pixels in a same row of pixels in the to-be-scanned image may be scanned in at least two different directions, so that an area that cannot be scanned in one scanning direction can be effectively compensated to a specific degree.

S220. Send the control signal to the micro-electro-mechanical scanning mirror.

In an example, the lasers corresponding to the pixels in the to-be-scanned image may be lasers emitted by a laser diode to the micro-electro-mechanical scanning mirror based on the pixels in the to-be-scanned image. For example, a three-color laser may be emitted based on each pixel in the to-be-scanned image, where the three-color laser includes a red laser, a green laser, or a blue laser.

After the micro-electro-mechanical scanning mirror obtains the lasers corresponding to the pixels in the to-be-processed image, the micro-electro-mechanical scanning mirror may be biaxially rotated based on the control signal, to project the received lasers of the pixels in the to-be-processed image onto a screen to composite the pixels in the to-be-scanned image, to display the to-be-scanned image, that is, obtain the projected image of the to-be-scanned image.

The screen may be a projection screen of a projector, or may be a display screen in an HUD system in a vehicle, for example, a front windshield of the vehicle.

It should be understood that the target scanning manner is a scanning manner in which the to-be-scanned image is scanned in at least two different directions. If a same row of pixels is scanned in one scanning direction, some areas cannot be scanned, and consequently a dark pattern appears in corresponding areas in the projected image of the to-be-scanned image. If a same row of pixels is scanned in at least two different directions, an area that cannot be scanned in one direction can be compensated to a specific degree. Therefore, scanning the to-be-scanned image in the target scanning manner in this embodiment of this application can effectively alleviate moire appearing in the projected image of the to-be-scanned image. This improves imaging quality of the projected image of the to-be-scanned image.

Optionally, in a possible implementation, an initial location of the first scanning manner and an initial location of the second scanning manner are located in a same row of pixels in the to-be-scanned image.

For example, the initial location of the first scanning manner and the initial location of the second scanning manner may be respectively located in opposite locations in a same row of pixels in the to-be-scanned image. For example, one row of pixels includes N columns, the initial location of the first scanning manner may be located in the first column in a same row of pixels, and the initial location of the second scanning manner may be located in an Nth column in the same row of pixels.

Figure 5:
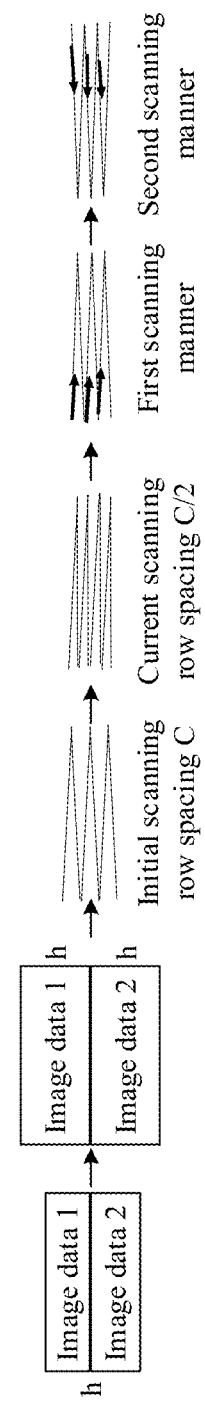
FIG. 5 is a schematic diagram of a target scanning manner according to an embodiment of this application.

In an example, as shown in FIG. 5, the first scanning manner may be a first-time scanning direction, and the second scanning manner may be a second-time scanning direction. Through first-time scanning, an area corresponding to an upper right corner cannot be projected, that is, laser energy of the area corresponding to the upper right corner is relatively low. Through second-time scanning, an area corresponding to an upper left corner cannot be projected, that is, laser energy of the area corresponding to the upper left corner is relatively low. In the two scanning manners with opposite directions, energy compensation can be effectively performed for the projection lasers, so that moire appearing in the projected image of the to-be-scanned image is effectively alleviated, thereby improving imaging quality of the projected image of the to-be-scanned image.

Optionally, in a possible implementation, the to-be-scanned image includes N columns of pixels, the initial location of the first scanning manner and the initial location of the second scanning manner may be respectively located in an $i^{th}$ column of pixels and a $j^{th}$ column of pixels in the to-be-scanned image, both i and j are positive integers less than or equal to N, and i is different from j.

For example, the initial location of the first scanning manner may be located in the first column of pixels in the to-be-scanned image, and the initial location of the second scanning manner may be located in the last column of pixels in the to-be-scanned image, that is, an $N^{th}$ column of pixels in the to-be-scanned image.

Optionally, in a possible implementation, the control signal is used to control, by using a phase shift method, the micro-electro-mechanical scanning mirror to implement the target scanning manner.

The phase shift method is a modulation method in which a deviation amount of an instantaneous phase angle of a frequency-modulated wave or a phase-modulated wave relative to a phase angle of a carrier changes with an instantaneous value of a modulation signal during frequency modulation or phase modulation, where a largest deviation amount is referred to as a phase shift, and frequency modulation (FM) enables an instantaneous frequency of a carrier to change according to a change rule of a signal that needs to be transmitted. The phase shift method is a modulation method in which an instantaneous frequency of a modulated wave is enabled to change with a modulation signal.

Optionally, in a possible implementation, a phase difference between a control signal used to control the micro-electro-mechanical scanning mirror to perform scanning in the first scanning manner and a control signal used to control the micro-electro-mechanical scanning mirror to perform scanning in the second scanning manner in the control signal is half a period.

Figure 7:
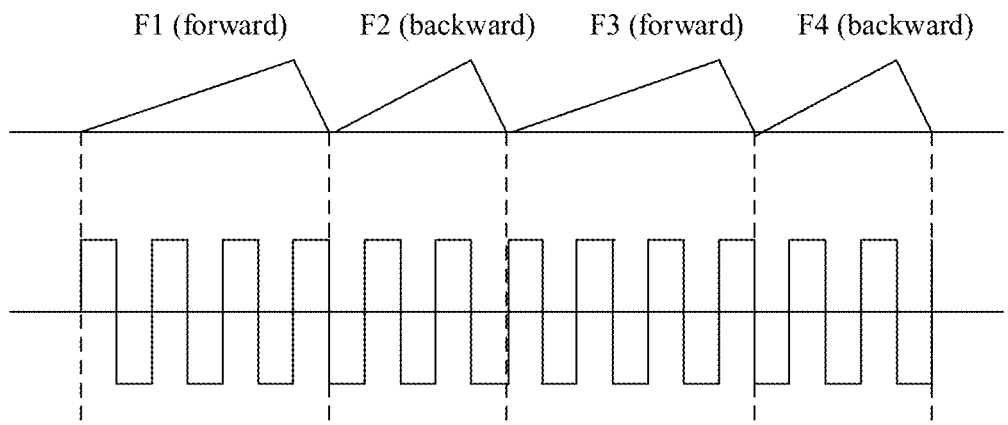
FIG. 7 is a schematic diagram of implementing a target scanning manner by using a phase shift method according to an embodiment of this application.

For example, as shown in FIG. 7, a fast-axis vibration frequency of the micro-electro-mechanical scanning mirror may be dynamically controlled to implement phase shift. For example, the first scanning manner may be a left-to-right scanning manner, and therefore half a phase may be controlled to be added through frequency adjustment; and the second scanning manner may be a right-to-left scanning manner, and therefore half a phase may be controlled to be reduced through frequency adjustment.

Further, in this embodiment of this application, a scanning row spacing of the micro-electro-mechanical scanning mirror may be further controlled by using the control signal. That is, the control signal may be used to enable the micro-electro-mechanical scanning mirror to project, based on the scanning row spacing in the target scanning manner, the lasers corresponding to the pixels in the to-be-scanned image.

In this embodiment of this application, a same row of pixels in the to-be-scanned image may be scanned in at least two different directions, so that an area that cannot be scanned in one direction can be compensated to a specific degree. Therefore, scanning a same row of pixels in at least two different directions can effectively reduce moire appearing in the projected image of the to-be-scanned image. This improves imaging quality of the projected image of the to-be-scanned image.

It should be noted that, in this embodiment of this application, a control signal used to control the micro-electro-mechanical scanning mirror to perform scanning in the target scanning manner and a control signal used to control the scanning row spacing of the micro-electro-mechanical scanning mirror may be sent to the micro-electro-mechanical scanning mirror together, or may be divided into a plurality of control signals and the plurality of control signals may be sent to the micro-electro-mechanical scanning mirror.

FIG. 4 is a schematic flowchart of a micro-electro-mechanical scanning mirror control method according to an embodiment of this application. A control method 300 shown in FIG. 4 includes step S310 to step S360. The following separately describes step S310 to step S360 in detail.

S310. Obtain an input image.

For example, as shown in FIG. 1, image input may be obtained by using the video processor and controller 110; or data of one frame of image may be obtained, or data of a plurality of frames of images may be obtained.

S320. Perform a copying process on each row of data in the image.

In an example, each row of data of each frame of image in the image may be copied once, and therefore a total quantity of rows of each frame of image obtained after the copying process is doubled.

Figure 6:
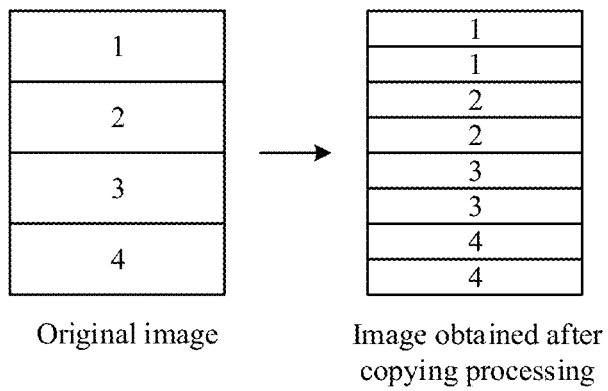
FIG. 6 is a schematic diagram of performing copying process on a to-be-scanned image according to an embodiment of this application.

For example, as shown in FIG. 6, one frame of an original image may include four rows of data, and each row of data in the original image may be copied once to obtain eight rows of image data obtained after the copying process.

In an example, each row of data of each frame of image may be alternatively copied a plurality of times. This is not limited in this embodiment of this application.

S330. Set a scanning row spacing.

For example, because a total size of the image is fixed, if each row of data in the image is copied once, the scanning row spacing is set to half an initial row spacing.

S340. Perform a first scanning manner on a current frame of image. That is, first-time scanning may be performed on the current frame.

For example, for one frame of image, the first scanning manner may be a left-to-right scanning manner, or the first scanning manner may be a right-to-left scanning manner.

S350. Perform a second scanning manner on the current frame of image. That is, second-time scanning may be performed on the current frame.

It should be understood that the second-time scanning manner is different from the first-time scanning manner. For example, directions of the two times of scanning may be staggered scanning manners, that is, the first scanning manner and the second scanning manner may be scanning manners in opposite directions. The staggered scanning manners may be a specific implementation of the target scanning manner shown in FIG. 3.

It should be noted that, although the first scanning manner and the second scanning manner have opposite scanning directions or have different initial scanning locations, the first scanning manner and the second scanning manner may have a same scanned image. For example, the two times of scanning may correspond to a same to-be-scanned image.

In a possible implementation, if the first scanning manner is a left-to-right scanning manner, the second scanning manner may be a right-to-left scanning manner.

In another possible implementation, if the first scanning manner is a right-to-left scanning manner, the second scanning manner may be a left-to-right scanning manner.

It should be understood that, two staggered scanning manners are performed on a same frame of image, so that an image can be evenly displayed on an imaging plane, that is, an area that is bright and gradually dim can be prevented from appearing in the image displayed on the imaging plane, that is, moire on the imaging plane can be effectively alleviated, thereby improving imaging quality.

S360. End scanning of the current frame of image.

For example, FIG. 5 is a schematic diagram of a target scanning manner according to an embodiment of this application.

As shown in FIG. 5, it is assumed that an original image includes h rows of data, that is, image data 1 and image data 2. A copying process may be performed on each row of data in the original image once to obtain image data that includes 2 h rows. Further, a current scanning row spacing is set to half an initial scanning row spacing C, namely, C/2. The image data obtained after the copying process is scanned based on the current scanning row spacing, where first-time scanning may be performed in a left-to-right scanning manner, and then second-time scanning may be performed, that is, the second-time scanning may be performed in a right-to-left scanning manner.

It should be noted that in FIG. 5, an example description is provided by using an example in which the first scanning manner may be a left-to-right scanning manner and the second scanning manner may be a right-to-left scanning manner. The second scanning manner is different from the first scanning manner, that is, directions of the two times of scanning may be staggered scanning manners. A specific direction of each-time scanning manner is not limited in this application.

It should be understood that the foregoing is an example description of the first scanning manner and the second scanning manner. In this embodiment of this application, the first scanning manner and the second scanning manner have different initial locations, and the to-be-scanned image may be scanned in at least two different directions by using the first scanning manner and the second scanning manner. Specific directions of the first scanning manner and the second scanning manner are not limited in this application.

FIG. 7 is a schematic diagram of implementing a target scanning manner by using a phase shift method according to an embodiment of this application.

As shown in FIG. 7, the foregoing target scanning manner may be implemented by using the phase shift method. Specifically, a fast-axis vibration frequency of a reflector of MEMS may be dynamically controlled to implement phase shift.

For example, a scanning manner of first-time scanning is a left-to-right scanning manner, and therefore half a phase may be controlled to be added through frequency adjustment, and a scanning manner of second-time scanning a right-to-left scanning manner, and therefore half a phase may be controlled to be reduced through frequency adjustment.

It should be noted that one complete period of scanning may be implemented by using two staggered scanning manners, that is, scanning of one frame of image may be completed by using two staggered scanning manners. That is, scanning of a first input image may be completed by using F1 and F2, and scanning of a second input image may be completed by using F3 and F4.

It should be noted that the foregoing example description is merely intended to help a person skilled in the art understand the embodiments of this application, instead of limiting the embodiments of this application to the illustrated specific value or specific scenario. It is clear that a person skilled in the art can make various equivalent modifications or variations based on the provided example description, and such modifications or variations also fall within the scope of the embodiments of this application.

The foregoing describes, in detail with reference to FIG. 1 to FIG. 7, the micro-electro-mechanical scanning mirror control method provided in the embodiments of this application. The following describes in detail an apparatus embodiment of this application with reference to FIG. 8 and FIG. 9. It should be understood that a micro-electro-mechanical scanning mirror control apparatus in the embodiments of this application may execute the foregoing various methods in the embodiments of this application. That is, for specific working processes of the following various products, refer to corresponding processes in the foregoing method embodiments.

Figure 8:
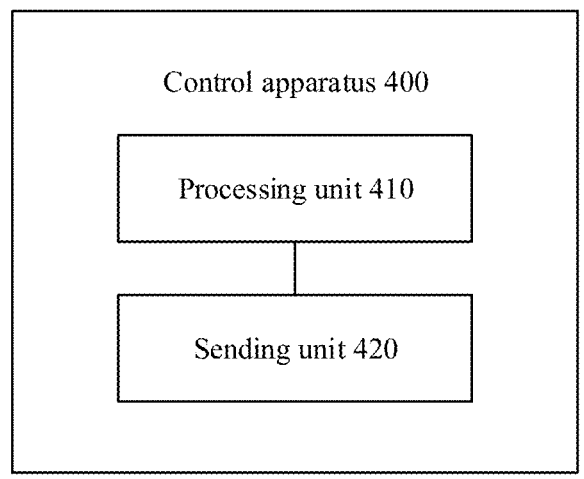
FIG. 8 is a schematic block diagram of a micro-electro-mechanical scanning mirror control apparatus according to an embodiment of this application.

FIG. 8 is a schematic block diagram of a micro-electro-mechanical scanning mirror control apparatus 400 according to an embodiment of this application.

It should be understood that the control apparatus 400 may execute the control method shown in FIG. 3 or the control method shown in FIG. 4. The control apparatus 400 includes a processing unit 410 and a sending unit 420.

The processing unit 410 is configured to generate a control signal, where the control signal is used to control a micro-electro-mechanical scanning mirror to project, in a target scanning manner, lasers corresponding to pixels in a to-be-scanned image, to output a projected image of the to-be-scanned image, the target scanning manner includes a first scanning manner and a second scanning manner, and the first scanning manner and the second scanning manner have different initial locations in the to-be-scanned image. The sending unit 420 is configured to send the control signal to the micro-electro-mechanical scanning mirror.

Optionally, in an embodiment, an initial location of the first scanning manner and an initial location of the second scanning manner are located in a same row of pixels in the to-be-scanned image.

Optionally, in an embodiment, the to-be-scanned image includes N columns of pixels, the initial location of the first scanning manner and the initial location of the second scanning manner are respectively located in an $i^{th}$ column of pixels and a $j^{th}$ column of pixels in the to-be-scanned image, both i and j are positive integers less than or equal to N, and i is different from j.

Optionally, in an embodiment, the control signal is used to control, by using a phase shift method, the micro-electro-mechanical scanning mirror to implement the target scanning manner.

Optionally, in an embodiment, a phase difference between a control signal used to control the micro-electro-mechanical scanning mirror to perform scanning in the first scanning manner and a control signal used to control the micro-electro-mechanical scanning mirror to perform scanning in the second scanning manner in the control signal is half a period.

Optionally, in an embodiment, the control signal is further used to control a scanning row spacing of the micro-electro-mechanical scanning mirror, so that the micro-electro-mechanical scanning mirror scans, in the target scanning manner based on the scanning row spacing, the lasers corresponding to the pixels in the to-be-scanned image.

It should be noted that the control apparatus 400 is embodied in a form of a functional unit. The term "unit" herein may be implemented in a form of software and/or hardware. This is not specifically limited.

For example, the "unit" may be a software program, a hardware circuit, or a combination thereof for implementing the foregoing function. The hardware circuit may include an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described function.

Therefore, the units in the examples described in this embodiment of this application can be implemented by using electronic hardware, or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

Figure 9:
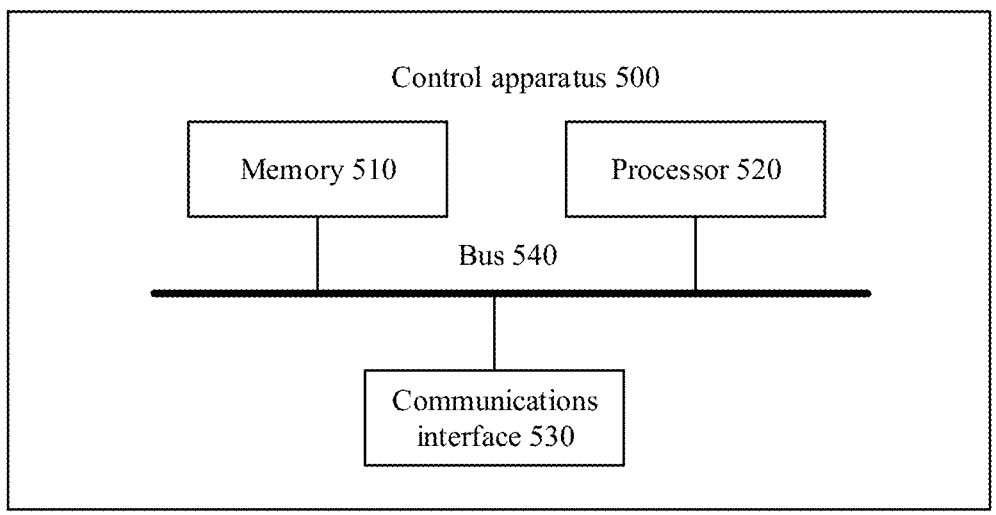
FIG. 9 is a schematic block diagram of a micro-electromechanical scanning mirror control apparatus according to an embodiment of this application.

FIG. 9 is a schematic diagram of a hardware structure of a micro-electro-mechanical scanning mirror control apparatus according to an embodiment of this application.

A control apparatus 500 shown in FIG. 9 (the control apparatus 500 may be specifically a computer device) includes a memory 510, a processor 520, a communications interface 530, and a bus 540. The memory 510, the processor 520, and the communications interface 530 may be communicatively connected to each other by using the bus 540.

The memory 510 may be a read-only memory (ROM), a static storage device, a dynamic storage device, or a random access memory (RAM). The memory 510 may store a program. When the program stored in the memory 510 is executed by the processor 520, the processor 520 is configured to execute the steps of the micro-electro-mechanical scanning mirror control method in the embodiments of this application, for example, the steps shown in FIG. 3 or FIG. 4.

The processor 520 may be a general-purpose central processing unit (CPU), a microprocessor, an application-specific integrated circuit (ASIC), a graphics processing unit (GPU), or one or more integrated circuits, and is configured to execute a related program to implement the micro-electro-mechanical scanning mirror control method in the method embodiments of this application.

Alternatively, the processor 520 may be an integrated circuit chip and has a signal processing capability. In an implementation process, the steps of the micro-electro-mechanical scanning mirror control method in this application may be completed by using an integrated logic circuit of hardware in the processor 520 or instructions in a form of software.

Alternatively, the processor 520 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 520 may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly executed by using a hardware decoding processor, or may be executed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 510. The processor 520 reads information in the memory 510; and in combination with hardware thereof, completes functions that need to be executed by the units included in the control apparatus shown in FIG. 8 in the embodiments of this application, or executes the micro-electro-mechanical scanning mirror control method shown in FIG. 3 or FIG. 4 in the method embodiments of this application.

The communications interface 530 implements communication between the control apparatus 500 and another device or a communications network by using, for example, without limitation, a transceiver apparatus such as a transceiver.

The bus 540 may include a path for transmitting information between components (such as the memory 510, the processor 520, and the communications interface 530) of the control apparatus 500.

It should be noted that although only the memory, the processor, and the communications interface in the control apparatus 500 are shown, in a specific implementation process, a person skilled in the art should understand that the control apparatus 500 may further include another component required for implementing normal running. In addition, based on a specific requirement, a person skilled in the art should understand that the control apparatus 500 may further include hardware components for implementing other additional functions. In addition, a person skilled in the art should understand that the control apparatus 500 may include only components required for implementing this embodiment of this application, but does not need to include all the components shown in FIG. 9.

For example, an embodiment of this application further provides a micro-electro-mechanical scanning mirror imaging system. The micro-electro-mechanical scanning mirror imaging system includes a micro-electro-mechanical scanning minor; and the foregoing micro-electro-mechanical scanning mirror control apparatus in the embodiments of this application.

For example, an embodiment of this application further provides a chip. The chip includes a transceiver unit and a processing unit. The transceiver unit may be an input/output circuit or a communications interface. The processing unit is a processor, a microprocessor, or an integrated circuit integrated into the chip. The chip may execute the foregoing micro-electro-mechanical scanning mirror control method in the method embodiments of this application.

For example, an embodiment of this application further provides a computer-readable storage medium. The computer-readable storage medium stores instructions. When the instructions are executed, the foregoing micro-electro-mechanical scanning mirror control method in the method embodiments of this application is executed.

For example, an embodiment of this application further provides a computer program product including instructions. When the instructions are executed, the foregoing micro-electro-mechanical scanning mirror control method in the method embodiments of this application is executed.

It should be understood that, the processor in the embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAMs) can be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded or executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification is merely an association relationship for describing associated objects, and indicates that three relationships may exist. For example, A and/or B may indicate three cases: only A exists, both A and B exist, and only B exists, where A or B may be singular or plural. In addition, in this specification, the character "/" usually indicates an "or" relationship between associated objects, but may alternatively indicate a "and/or" relationship. For details, refer to the context for understanding.

In this application, "at least one" means one or more, and "a plurality of" means two or more. The term "at least one of the following items" or a similar expression means any combination of these items, including any combination of singular items of plural items. For example, at least one of a, b, or c may indicate a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed in a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to execute all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A micro-electro-mechanical scanning mirror control method, comprising:

generating a control signal, wherein the control signal is used to control a micro-electro-mechanical scanning mirror to project, in a target scanning manner, lasers corresponding to pixels in a to-be-scanned image, to output a projected image of the to-be-scanned image, and wherein the target scanning manner comprises at least one of a first scanning manner or a second scanning manner, and the first scanning manner and the second scanning manner have different initial locations in the to-be-scanned image, and wherein the first scanning manner or the second scanning manner is selected by using a phase shift technique; and sending the control signal to the micro-electro-mechanical scanning mirror.

2. The control method according to claim 1, wherein an initial location of the first scanning manner and an initial location of the second scanning manner are located in a same row of pixels in the to-be-scanned image.

3. The control method according to claim 1, wherein the to-be-scanned image comprises N columns of pixels, an initial location of the first scanning manner and an initial location of the second scanning manner are respectively located in an $i^{th}$ column of pixels and a $j^{th}$ column of pixels in the to-be-scanned image, both i and j are positive integers less than or equal to N, and i is different from j.

4. The control method according to claim 1, wherein a phase difference between a first control signal used to control the micro-electro-mechanical scanning mirror to perform scanning in the first scanning manner and a second control signal used to control the micro-electro-mechanical scanning mirror to perform scanning in the second scanning manner in the control signal is half a period.

5. The control method according to claim 1, wherein the control signal is further used to control a scanning row spacing of the micro-electro-mechanical scanning mirror, and wherein the micro-electro-mechanical scanning mirror projects, in the target scanning manner based on the scanning row spacing, the lasers corresponding to the pixels in the to-be-scanned image.

6. A micro-electro-mechanical scanning mirror control apparatus, comprising at least one processor, and one or more memories coupled to the at least one processor and storing programming instructions for execution by the at least one processor that cause the control apparatus to:

generate a control signal, wherein the control signal is used to control a micro-electro-mechanical scanning mirror to project, in a target scanning manner, lasers corresponding to pixels in a to-be-scanned image, to output a projected image of the to-be-scanned image, and wherein the target scanning manner comprises at least one of a first scanning manner or a second scanning manner, and the first scanning manner and the second scanning manner have different initial locations in the to-be-scanned image, and wherein the first scanning manner or the second scanning manner is selected by using a phase shift technique; and send the control signal to the micro-electro-mechanical scanning mirror.

7. The control apparatus according to claim 6, wherein an initial location of the first scanning manner and an initial location of the second scanning manner are located in a same row of pixels in the to-be-scanned image.

8. The control apparatus according to claim 6, wherein the to-be-scanned image comprises N columns of pixels, an initial location of the first scanning manner and an initial location of the second scanning manner are respectively located in an $i^{th}$ column of pixels and a $j^{th}$ column of pixels in the to-be-scanned image, both i and j are positive integers less than or equal to N, and i is different from j.

9. The control apparatus according to claim 6, wherein a phase difference between a first control signal used to control the micro-electro-mechanical scanning mirror to perform scanning in the first scanning manner and a second control signal used to control the micro-electro-mechanical scanning mirror to perform scanning in the second scanning manner in the control signal is half a period.

10. The control apparatus according to claim 6, wherein the control signal is further used to control a scanning row spacing of the micro-electro-mechanical scanning mirror, and wherein the micro-electro-mechanical scanning mirror projects, in the target scanning manner based on the scanning row spacing, the lasers corresponding to the pixels in the to-be-scanned image.

11. A non-transitory computer-readable storage medium storing one or more programming instruction executable by at least one processor to cause the at least one processor to:

generate a control signal, wherein the control signal is used to control a micro-electro-mechanical scanning mirror to project, in a target scanning manner, lasers corresponding to pixels in a to-be-scanned image, to output a projected image of the to-be-scanned image, and wherein the target scanning manner comprises at least one of a first scanning manner or a second scanning manner, and the first scanning manner and the second scanning manner have different initial locations in the to-be-scanned image, and wherein the first scanning manner or the second scanning manner is selected by using a phase shift technique; and send the control signal to the micro-electro-mechanical scanning mirror.

12. The computer-readable storage medium according to claim 11, wherein an initial location of the first scanning manner and an initial location of the second scanning manner are located in a same row of pixels in the to-be-scanned image.

13. The computer-readable storage medium according to claim 11, wherein the to-be-scanned image comprises N columns of pixels, an initial location of the first scanning manner and an initial location of the second scanning manner are respectively located in an ith column of pixels and a jth column of pixels in the to-be-scanned image, both i and j are positive integers less than or equal to N, and i is different from j.

14. The computer-readable storage medium according to claim 11, wherein a phase difference between a first control signal used to control the micro-electro-mechanical scanning mirror to perform scanning in the first scanning manner and a second control signal used to control the micro-electro-mechanical scanning mirror to perform scanning in the second scanning manner in the control signal is half a period.

15. The computer-readable storage medium according to claim 11, wherein the control signal is further used to control a scanning row spacing of the micro-electro-mechanical scanning mirror, and wherein the micro-electro-mechanical scanning mirror projects, in the target scanning manner based on the scanning row spacing, the lasers corresponding to the pixels in the to-be-scanned image.

* * * * *